Aug. 31, 1954   G. R. WILTSHIRE   2,687,889
ELECTRICALLY-CONTROLLED ANIMATED RACE GAME
Filed Oct. 20, 1950   3 Sheets-Sheet 1

Patented Aug. 31, 1954

2,687,889

UNITED STATES PATENT OFFICE 2,687,889

ELECTRICALLY-CONTROLLED ANIMATED RACE GAME

George Reginald Wiltshire, Colombo, Ceylon

Application October 20, 1950, Serial No. 191,233

2 Claims. (Cl. 273—86)

The invention, for "Electrically-Controlled Animated Race Game" relates to an electrical device for interpreting the motions in race games into electrical impulses to permit the tracing of a small or large animated moving picture of the race whilst in progress, also an accurate and automatic indication of the winner, second place, and third place opponents.

According to the present invention the device consists of a number of electrically operated relays each fitted with contacts, together with electrical impulse driven multiple contact units all suitably interconnected as to be capable of receiving and storing electrical impulses initiated by several competitors in the race game, thus providing, through the medium of a like number of groups of electric light bulbs, a reproduction or animation of the race movements; the circuitry being so devised to also record which group of lights travel the faster when illuminated successively in terms of distance.

The purpose of this invention is to manufacture a race game which actuates to test the skill of the competitors participating in the game. Its purpose is to simulate such well known sports as horse racing, dog racing, car racing, hunting, boat racing and such other sports. The invention would take the form of a manufactured unit capable of being operated in the home or clubs or large meeting places where the competitors participating in the race game can if necessary be watched by a large collection of people. The race game would be one relying definitely on the skill of the competitors competing.

One particular construction which is particularly suitable for adaptation to the above invention is a horse race game with competitors mounted on model horses which are so constructed and interconnected to an electrically illuminated model race track also to control relays to provide in animated form the nearest possible parallel to a real horse race. Dog racing games, hackery race games, horse and fox race games, rowing races etc. are like games which can be suitably adapted to the invention.

In order that the invention may be more clearly understood reference will now be made to the accompanying drawings which illustrate the invention as applied to a horse race game, adopting for the purpose of explanation four model horses.

Fig. 3 accordingly shows diagrammatically the complete assembly.

Figure 1:
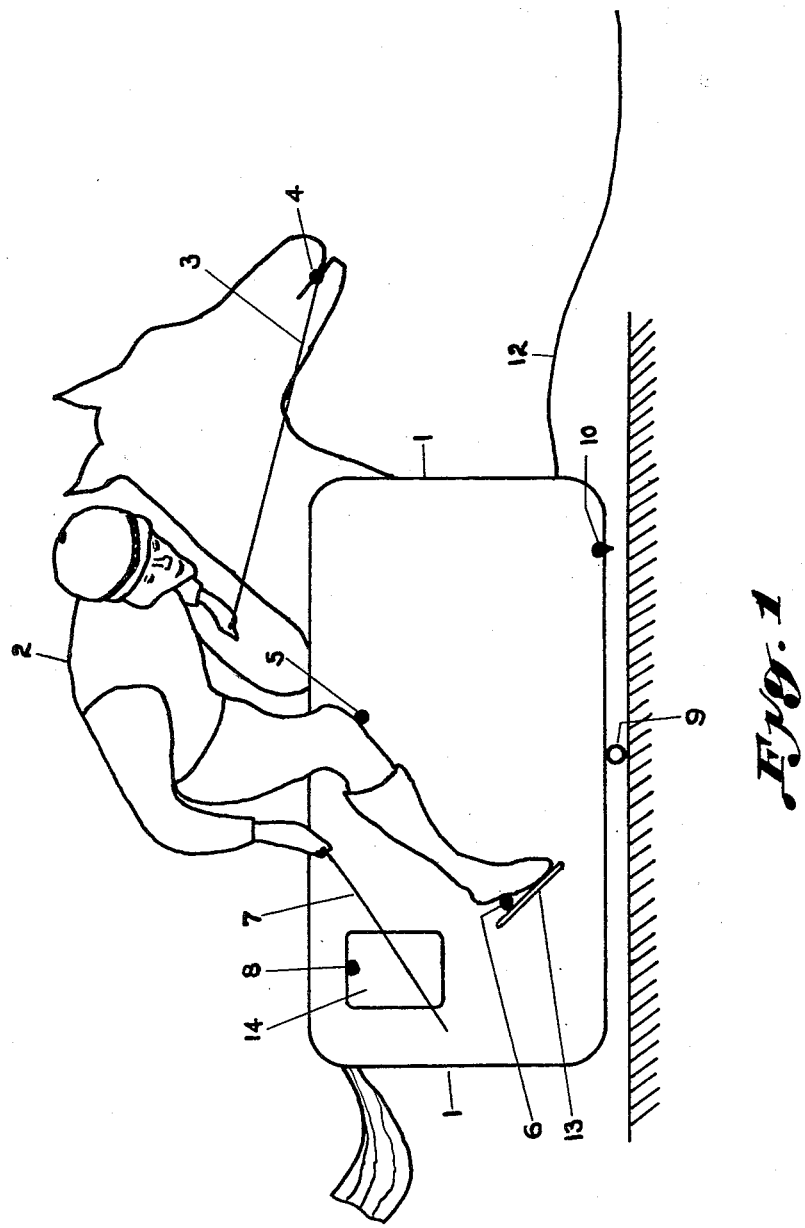
Fig. 1 shows a diagrammatic representation of a model horse.

Referring to Fig. 1 this shows diagrammatically a model horse 1 with a competitor 2 astride the model horse 1, the competitor's function being to take up the following riding position when participating in a race game:

(a) Hold the reins 3 in one hand to make contact 4.

(b) Grip the knees to make contact 5.

(c) Place feet on stirrups 13 to make contact 6.

(d) Hold whip 7 in the other hand.

When participating in a race game the competitors 2, Fig. 1, strike plate 14, Fig. 1, in a whipping action to make and break contact 8, Fig. 1, as often as possible, at the same time rocking the model horse 1, Fig. 1, on its fulcrum 9, Fig. 1, to make and break contact 10, Fig. 1. Such action generates a series of electrical impulses which are transmitted along the connecting cables 12, Figs. 1 and 3; the frequency of the impulses being dependent on the rate of whipping and rocking by the competitor 2, Fig. 1, mounted on the model horse 1, Fig. 1.

Figure 2:
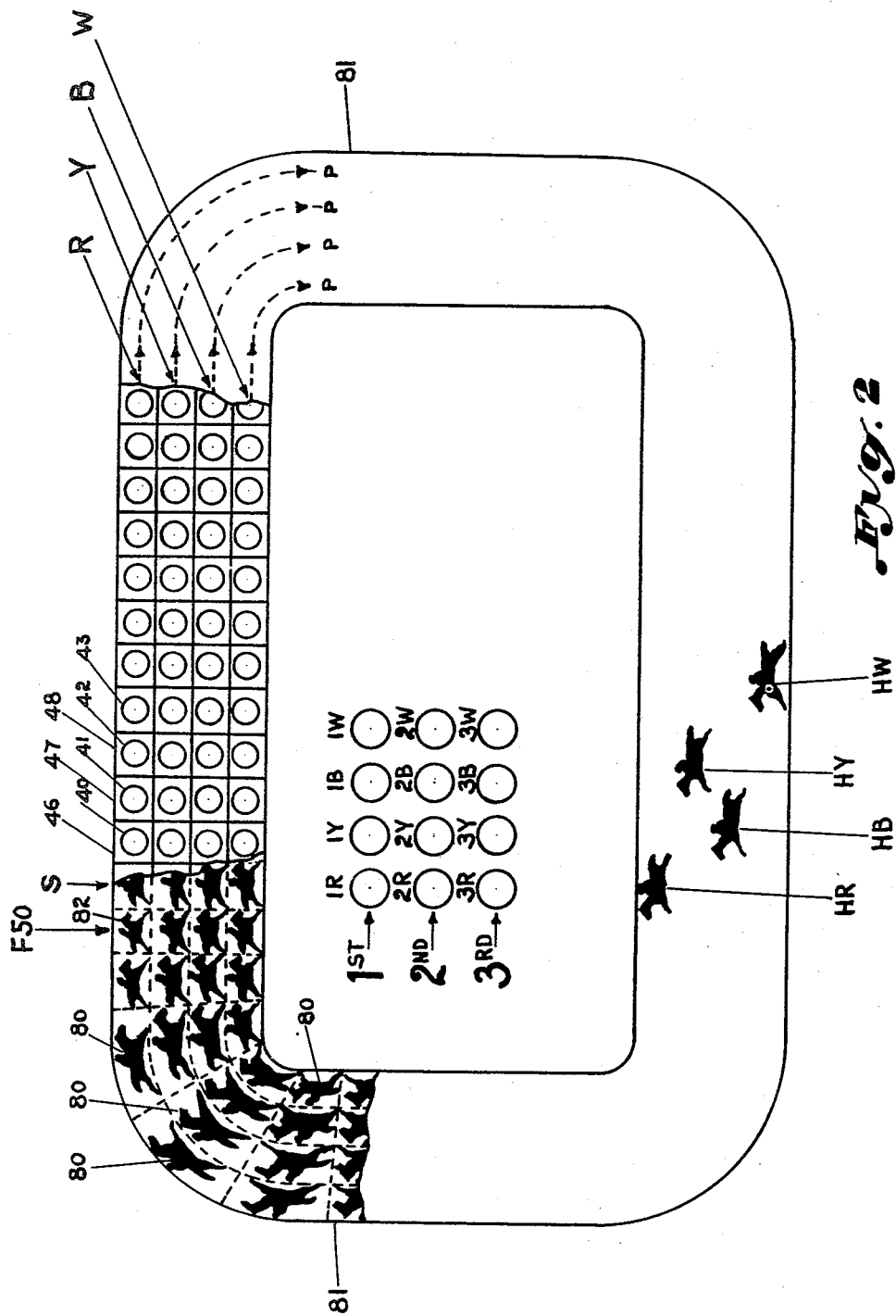
Fig. 2 shows diagrammatically a model horse race track, say, 6 ft. by 4 ft. though sizes up to 100 ft. by 50 ft. or larger are possible.
Figure 3:
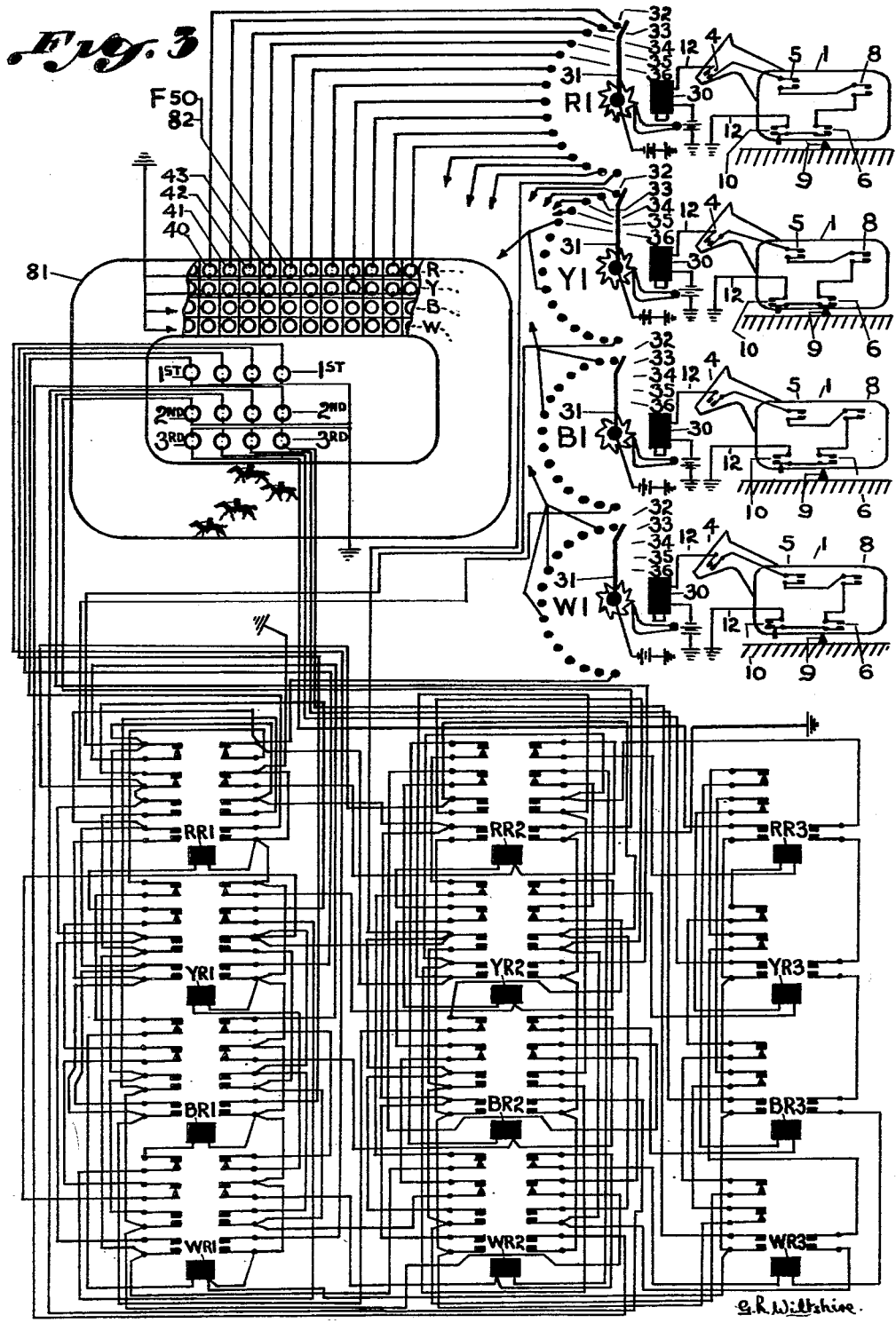
Fig. 3 shows the diagram of electrical connections between all the relays and the associated impulse contactors, also the interconnections between the four representative model horses as Fig. 1 and a model race track as per Fig. 2.

Referring now to Fig. 3 the electrical impulses transmitted over connecting cables 12, Figs. 1 and 3, from the model horse 1, Figs. 1 and 3, as explained in the preceding paragraph, causes an electrical impulse driven multiple contact unit 30, Fig. 3, to move its armature 31, Fig. 3, successively from contact 32 to 33 to 34 to 35 to 36 etc., Fig. 3, at a speed synchronous with the electrical impulses transmitted over connecting cables 12, Figs. 1 and 3. Each of the contacts 32, 33, 34, 35, 36, etc., Fig. 3, is connected to separate electric light bulbs 40, 41, 42, 43, etc., Figs. 2 and 3, which light or illuminate successively in step with the impulses initiated by the competitors 2, Fig. 1, mounted on the model horses 1, Figs. 1 and 3, over connecting cables 12.

Referring to Fig. 2 it will be noted that the actual track of the model horse track 81, Fig. 2, consists of four sections or circuits marked R, Y, B, W, Fig. 2, representing respectively the path P for the four model horses considered for the purpose of this explanation. Each of the four circuits R, Y, B, W, Fig. 2, is made up of numerous cells as 46, 47, 48, etc., Fig. 2, to accommodate electric light bulbs 40, 41, 42, 43, etc., Figs. 2 and 3, which as previously referred to and described in the preceding paragraph light up or become illuminated successively in step with the impulses initiated by the competitor 2, Fig. 1, on model horse 1, Fig. 1, or any of the competitors on the four model horses 1, Fig. 3, assumed as a competing team. All electric light bulbs 40, 41, 42, etc., Fig. 2, are each covered by a strip of suitable transparent material, such as paper, cut to the shape of a silhouette of a running horse 80, Fig. 2. As electric light bulbs 40, 41, 42, 43, etc., Fig. 2, are connected to successively illuminate the silhouettes of the running horses 80, Fig. 2, which cover the respective electric light bulbs, the resultant effect is an animated moving picture of horses as HR, HB, HY, HW, Fig. 2, running around the model race track 81, Fig. 2, which simulates to a marked degree a real horse race. The effect is supported by the competitors 2 mounted on the model horses 1, Fig. 1, who actually initiate the animation by (a) their whipping action with the whip 7, Fig. 1, on plate 14, Fig. 1, to make and break contact 8, Figs. 1 and 3, and by (b) their rocking of model horse 1 to make and break contact 10, Fig. 1. These actions result in the transmission of a rapid succession of electrical impulses through connecting cables 12, Figs. 1 and 3, to actuate the impulse driven multiple contact unit 30, Fig. 3, to move armature 31, Fig. 3, successively over contacts 32, 33, 34, 35, 36, etc., Fig. 3, which successively connect to illuminate electric light bulbs 40, 41, 42, etc., Figs. 2 and 3. The result is an animated picture as HR, HB, HY, HW, Fig. 2, of the race through the medium of the successively illuminated electric light bulbs 40, 41, 42, 43, etc., Fig. 2, on model race track 81, Figs. 2 and 3, as described previously.

The sum effect is to provide to the spectators a spirited race game between the assumed four competitors on the model horses 1, Fig. 3, also an animated effect of a horse race on the model race track 81, Fig. 2.

To ensure accurate and indisputable indication of the winner, also the second and third place horses, electric relays RR1, YR1, BR1, WR1, RR2, YR2, BR2, WR2, RR3, YR3, BR3 and WR3, Fig. 3, are incorporated in the circuit to actuate suitably when an illuminated animated picture of a race horse on track 81, Fig. 2, reaches the finishing post F50, Fig. 2, to cause an electric light bulb 82, Figs. 2 and 3, in either of the tracks R, Y, B, W, Figs. 2 and 3, to be illuminated. The result is to indicate at 1R or 1Y or 1B or 1W, Fig. 2, that the winner has actually reached the finishing post F50, Figs. 2 and 3, in the fastest time. A similar recording follows for the 2nd and 3rd place competitors on the model horses 1, Fig. 3.

Actuation of relays RR1 or YR1 or BR1 or WR1, Fig. 3, results in the illumination of an electric light bulb 1R or 1Y or 1B or 1W, Fig. 2, to indicate which of the four competitors reached the finishing post F50, Figs. 2 and 3, first.

A similar recording follows for the 2nd place competitor through relays RR2 or YR2 or BR2 or WR2, Fig. 3, and electric light bulbs 2R or 2Y or 2B or 2W, Fig. 2, to indicate which of the four competitors reached the finishing post F50, Figs. 2 and 3, second.

A further similar recording follows for 3rd place through relays RR3 or YR3 or BR3 or WR3, Fig. 3, and electric light bulbs 3R or 3Y or 3B or 3W, Fig. 2, to indicate which of the four competitors reached the finishing post third.

What I claim is:

1. A race game comprising a plurality of models each adapted to be mounted by a person; each model being pivoted on a fulcrum to enable a rocking action to be produced by the person; each model carrying a plurality of normally-open contacts in a control circuit containing an impulse driven multiple contact unit; a plurality of tracks, each track having a plurality of lamps electrically connected to one of the said contact units with the normally-open contacts so located on each model to be simultaneously closed by the person rocking and whipping the model and by appropriate action of the hands, feet and knees of the person astride the model, the closing of the circuit resulting from the person's movements pulsing the impulse driven multiple contact unit step by step to successively include in its circuit the plurality of lamps of each track which illuminate one by one and progressively along the said track to provide the effect of movement, such being a measure of the skill of the person mounted on a model; the operation of a plurality of models by a plurality of persons constituting a competitive race game.

2. A construction according to claim 1, each track being divided into cells, each cell accommodating an electric lamp, the numerous lamps for each track being connected in a circuit to one of said impulse driven multiple contact units to result in the lamps being progressively illuminated in step with the movement of the impulse driven multiple contact unit when the said impulse driven multiple contact unit is successively pulsed from contact to contact of its bank of multiple contacts by said control circuit; each lamp cell in the plurality of tracks being covered with a transparent silhouette of the subject of the race game to produce an animated and moving effect when the lamps in the cells of each of the tracks are progressively illuminated.

References Cited in the file of this patent

UNITED STATES PATENTS

| Number | Name | Date |
| --- | --- | --- |
| 737,257 | Majno | Aug. 25, 1903 |
| 1,518,754 | Prina et al. | Dec. 9, 1924 |
| 1,556,984 | Wolkenhauer | Oct. 13, 1925 |
| 1,960,395 | Phillips | May 29, 1934 |
| 2,197,520 | Ebert | Apr. 16, 1940 |
| 2,225,508 | Lauterbach | Dec. 17, 1940 |
| 2,504,007 | Declercq | Apr. 11, 1950 |